US010176043B2

(12) United States Patent
Lesartre et al.

(10) Patent No.: US 10,176,043 B2
(45) Date of Patent: Jan. 8, 2019

(54) MEMORY CONTROLLER

(71) Applicant: HEWLETT PACKARD ENTERPRISE DEVELOPMENT LP, Houston, TX (US)

(72) Inventors: Gregg B. Lesartre, Fort Collins, CO (US); Chris Michael Brueggen, Allen, TX (US); Lidia Warnes, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 79 days.

(21) Appl. No.: 15/314,902

(22) PCT Filed: Jul. 1, 2014

(86) PCT No.: PCT/US2014/045117
§ 371 (c)(1),
(2) Date: Nov. 29, 2016

(87) PCT Pub. No.: WO2016/003449
PCT Pub. Date: Jan. 7, 2016

(65) Prior Publication Data
US 2017/0199785 A1    Jul. 13, 2017

(51) Int. Cl.
*G06F 11/10* (2006.01)
*G06F 11/07* (2006.01)
(Continued)

(52) U.S. Cl.
CPC .......... *G06F 11/1076* (2013.01); *G06F 3/064* (2013.01); *G06F 3/0604* (2013.01);
(Continued)

(58) Field of Classification Search
CPC .. G06F 11/1076; G06F 3/0604; G06F 3/0619; G06F 3/064; G06F 3/0659;
(Continued)

(56) References Cited

U.S. PATENT DOCUMENTS 6,510,528 B1 *  1/2003  Freeman ............... G06F 11/106
                                                        713/324
6,766,429 B1 *  7/2004  Bland .................. G06F 11/1666
                                                        711/117
(Continued)

FOREIGN PATENT DOCUMENTS

WO   WO-2009121022    10/2009
WO   WO-2014051550    4/2014

OTHER PUBLICATIONS

Awasthi et al., Efficient Scrub Mechanisms for Error-Prone Emerging Memories, ResearchGate, Feb. 2012, pp. 1-13.*
(Continued)

*Primary Examiner* — John J Tabone, Jr.
(74) *Attorney, Agent, or Firm* — Michael A. Dryja

(57) ABSTRACT

Example implementations relate to a memory controller. For example, an apparatus includes a data storage device and a memory controller coupled to the data storage device. The memory controller is to perform, during a memory scrubbing operation, a corrective action to correct an error associated with a data block stored in the data storage device. The memory control is to determine, during the memory scrubbing operation, whether the corrective action is successful. In response to a determination that the corrective action is a failed corrective action, the memory controller is to fix a hardware failure of the data storage device based on a type of the hardware failure.

16 Claims, 5 Drawing Sheets

(51) Int. Cl.
*G06F 3/06* (2006.01)
*G06F 11/20* (2006.01)

(52) U.S. Cl.
CPC .......... *G06F 3/0619* (2013.01); *G06F 3/0659* (2013.01); *G06F 3/0673* (2013.01); *G06F 11/0727* (2013.01); *G06F 11/0793* (2013.01); *G06F 11/106* (2013.01); *G06F 11/2094* (2013.01); *G06F 2201/81* (2013.01)

(58) Field of Classification Search
CPC .............. G06F 3/0673; G06F 11/0727; G06F 11/0793; G06F 11/2094; G06F 2201/81; G06F 11/106
USPC ................................ 714/764, 763, 718, 773
See application file for complete search history.

(56) References Cited

U.S. PATENT DOCUMENTS

| | | | |
|---|---|---|---|
| 7,246,269 | B1 | 7/2007 | Hamilton |
| 7,650,557 | B2 * | 1/2010 | Totolos, Jr. ........... G06F 11/106 714/718 |
| 7,913,147 | B2 | 3/2011 | Swaminathan et al. |
| 8,122,308 | B2 | 2/2012 | Buch |
| 8,307,259 | B2 * | 11/2012 | Wheeler ............... G06F 11/106 714/764 |
| 8,572,455 | B2 | 10/2013 | Blackmon et al. |
| 8,732,551 | B2 | 5/2014 | Chirca et al. |
| 2002/0162075 | A1 * | 10/2002 | Talagala .............. G06F 11/1076 714/819 |
| 2002/0162076 | A1 * | 10/2002 | Talagala .............. G06F 11/1076 714/819 |
| 2007/0079185 | A1 * | 4/2007 | Totolos, Jr. ........... G06F 11/106 714/718 |
| 2007/0094569 | A1 | 4/2007 | Thayer et al. |
| 2007/0186135 | A1 * | 8/2007 | Flachs ................. G06F 11/1044 714/752 |
| 2008/0239808 | A1 * | 10/2008 | Lin ....................... G06F 11/106 365/185.09 |
| 2008/0239851 | A1 * | 10/2008 | Lin ..................... G11C 16/3418 365/222 |
| 2009/0070654 | A1 * | 3/2009 | Flachs ................. G06F 11/1044 714/758 |
| 2010/0332900 | A1 | 12/2010 | Yang |
| 2011/0041005 | A1 * | 2/2011 | Selinger .................. G06F 11/10 714/719 |
| 2011/0161784 | A1 * | 6/2011 | Selinger .............. G06F 11/1068 714/768 |
| 2012/0284575 | A1 | 11/2012 | Foley |
| 2012/0311379 | A1 | 12/2012 | Moyer |
| 2013/0151767 | A1 | 6/2013 | Berke et al. |
| 2013/0179740 | A1 | 7/2013 | Jeddeloh |
| 2014/0040697 | A1 * | 2/2014 | Loewenstein ....... G06F 11/1016 714/758 |
| 2014/0052924 | A1 | 2/2014 | Ramaraju et al. |

OTHER PUBLICATIONS

Bridges, P.G. et al., Fault-tolerant Linear Solvers via Selective Reliability, (Research Paper), Jun. 8, 2012, 45 Pages.
International Searching Authority, The International Search Report and the Written Opinion, dated Feb. 25, 2015, 10 Pages.

* cited by examiner

MEMORY CONTROLLER

BACKGROUND

Data storage device, such as a Random Access Memory (RAM) module and a hard disk drive, may store data for use by a computing device. The stored data may contain errors caused by external factors, such as cosmic rays, solar particles, and/or alpha particle emissions.

BRIEF DESCRIPTION OF THE DRAWINGS

Some examples of the present application are described with respect to the following figures.

DETAILED DESCRIPTION

As described above, data stored in a data storage device may contain errors caused by external factors, such as cosmic rays, solar particles, and/or alpha particle emissions. When a computing device executes processor executable instructions to access the data that contain the errors, the errors may cause the processor executable instructions to malfunction. The processor executable instructions may instruct a processor of the computing device to correct the errors via an interrupt. In response to the interrupt, the processor may suspend a task that is currently being executed at the processor and spend processor cycles to correct the errors. The processor may resume the task after correcting the errors. Thus, the number of available processor cycles for task execution is reduced.

Examples described herein address the above challenges by providing a memory controller to correct an error detected in data stored in a data storage device and to fix a hardware failure of the data storage device. The memory controller may correct the error and fix the hardware failure without involving a processor of a computing device that is connected to the data storage device. For example, the memory controller may inspect a data block stored in the data storage device for error during a memory scrubbing operation. In response to detecting an error, the memory controller may perform a corrective action to correct the error, for example, by using Error-Correcting Codes (ECC). Subsequent to performing the corrective action, the memory controller may inspect the data block to determine whether the corrective action is successful.

When the corrective action is successful, the memory controller may inspect other data blocks for error. When the corrective action is unsuccessful (i.e., the error is still present), the unsuccessful corrective action may indicate that that there is a hardware failure of the data storage device. Based on a type of the hardware failure, the memory controller may apply a distinct repair mechanism to fix the hardware failure. The memory controller may correct the error and to fix the hardware failure automatically without the use of an interrupt. Thus, the processor may not be involved. In this manner, examples described herein may increase the number of available processor cycles for task execution.

Figure 1:
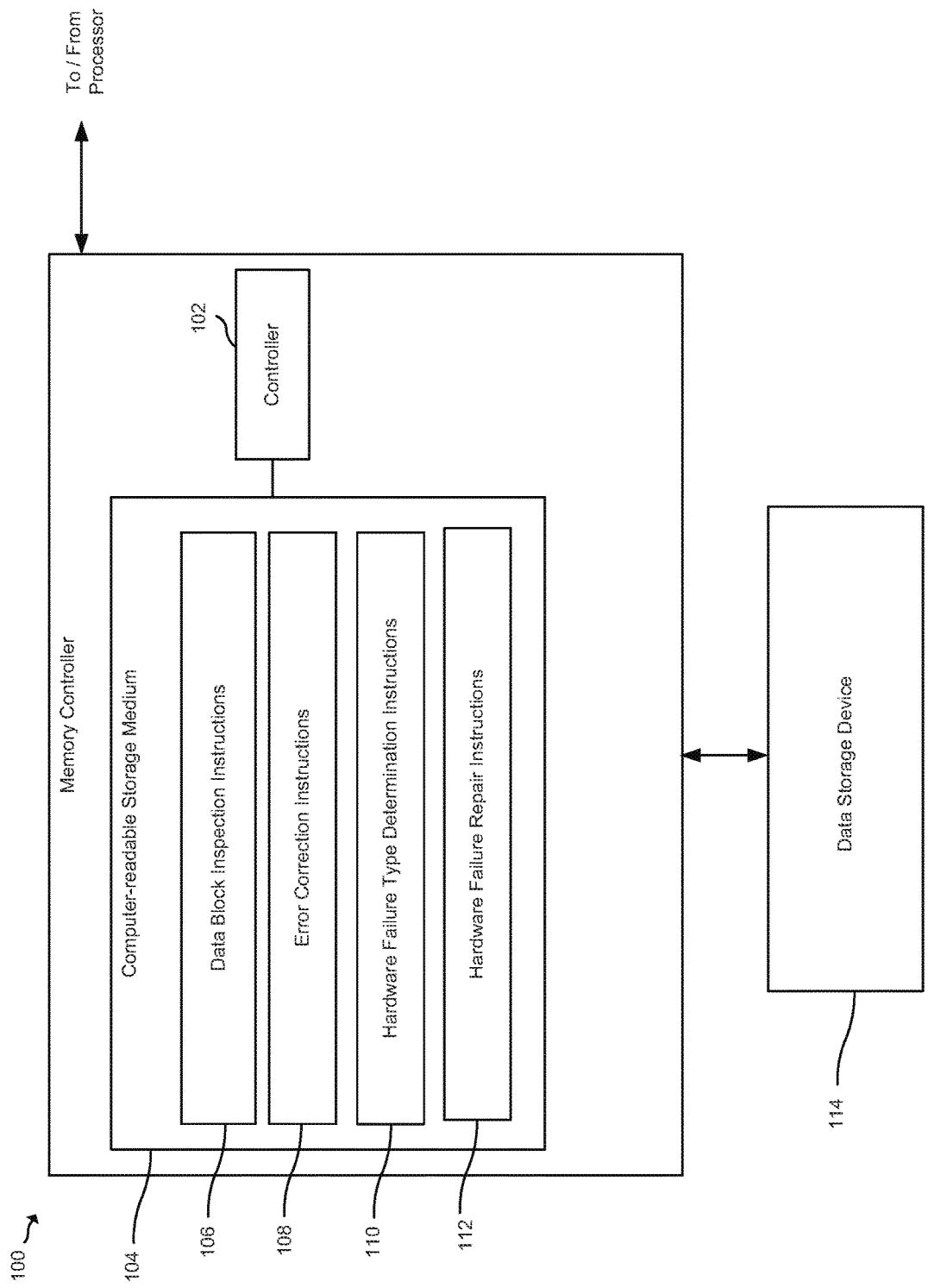
FIG. 1 is a block diagram of a memory controller for correcting an error in stored data and fixing a hardware failure of a data storage device, according to an example.

Referring now to the figures, FIG. 1 is a block diagram of a memory controller 100 for correcting an error in stored data and fixing a hardware failure of with a data storage device, according to an example. Memory controller 100 may be any circuitry or electronic device suitable to correct an error in stored data and to fix a hardware failure of with a data storage device. Memory controller 100 may manage data flow between a processor of a computing device and a data storage device of the computing device. For example, memory controller 100 may be a RAM controller. As another example, memory controller 100 may be a cache memory controller. Memory controller 100 may include a controller 102 and a computer-readable storage medium 104.

Controller 102 may be a semiconductor-based microprocessor and/or any hardware device suitable for retrieval and execution of instructions stored in computer-readable storage medium 104. Controller 102 may fetch, decode, and execute instructions 106, 108, 110, and 112 to control a process of correcting an error in data stored in a data storage device 114 and fixing a hardware failure of data storage device 114. As an alternative or in addition to retrieving and executing instructions 106-112, controller 102 may include at least one electronic circuit that includes electronic components for performing the functionality of instructions 106, 108, 110, 112, or a combination thereof.

Computer-readable storage medium 104 may be any electronic, magnetic, optical, or other physical storage device that contains or stores instructions executable within memory controller 100. Thus, computer-readable storage medium 104 may be, for example, Random Access Memory (RAM), an Electrically Erasable Programmable Read-Only Memory (EEPROM), a storage device, an optical disc, etc. In some examples, computer-readable storage medium 104 may be a non-transitory storage medium, where the term "non-transitory" does not encompass transitory propagating signals. As described in detail below, computer-readable storage medium 104 may be encoded with a series of processor executable instructions 106, 108, 110, and 112 for correcting an error in data stored in data storage device 114 and fixing a hardware failure of data storage device 114. Data storage device 114 may be any circuitry or device suitable to hold and/or record information. For example, data storage device 114 may be a RAM module, a hard disk drive, etc. In some examples, data storage device 114 may be implemented using at least one memristor device.

During operation, memory controller 100 may retrieve data from data storage device 114 and transmit the retrieved data to a component of a computing device, such as a processor. Memory controller 100 may also store data transmitted from other components of the computing device to data storage device 114 for subsequent use. Further, memory controller 100 may perform scrubbing on data stored in data storage device 114 during a memory scrubbing operation. As used herein, a memory scrubbing operation may correspond to a process of inspecting data for error, correcting any error found, and/or fixing any hardware failure of data storage device 114. Memory controller 100 may perform a memory scrubbing operation independent of an interrupt by automatically performing the memory scrubbing operation periodically. Memory controller 100 may perform a memory scrubbing operation gradually, consuming only a small portion of the available bandwidth to the storage media. Thus, memory controller 100 may perform a memory scrubbing operation without burdening the processor.

During a memory scrubbing operation, data block inspection instructions 106 may inspect data stored in data storage device 114 for error. For example data block inspect instructions 106 may inspect the data by reading from data storage device 114 one data block at a time. As used herein, a data block may be unit measurement for a quantity of data. For example, a data block may correspond to 64 bytes of data.

During the memory scrubbing operation, error correction instructions 108 may perform a corrective action to correct an error identified by data block inspection instructions 106. For example, error correction instructions 108 may use Error-Correcting Codes (ECC) to correct the error. Subsequent to performing the corrective action, error correction instructions 108 may inspect the data block to determine whether the corrective action is successful. The corrective action is successful when there is no error in the data block. Thus, the error may be categorized as a soft error. A soft error may be an error resulted from a transient issue and may be corrected by overwriting the erroneous data with correct data.

The corrective action is not successful when an error still exists in the data block. Thus, the error may be categorized as a hard error. A hard error may be an error resulted from a hardware failure of data storage device 114. Thus, an unsuccessful corrective action may indicate a hardware failure of data storage device 114.

In response to determining that there is a hardware failure in data storage device 114, hardware failure type determination instructions 110 may determine a type of the hardware failure. Hardware failure repair instructions 112 may fix the hardware failure during the memory scrubbing operation. Hardware failure repair instructions 112 may fix the hardware failure based on the type of the hardware failure. Determining a type of a hardware failure is described in more detail in FIG. 2. In some examples, hardware failure repair instructions 112 may fix the hardware failure based on a type of the hardware failure and based on a severity of the hardware failure.

Figure 2:
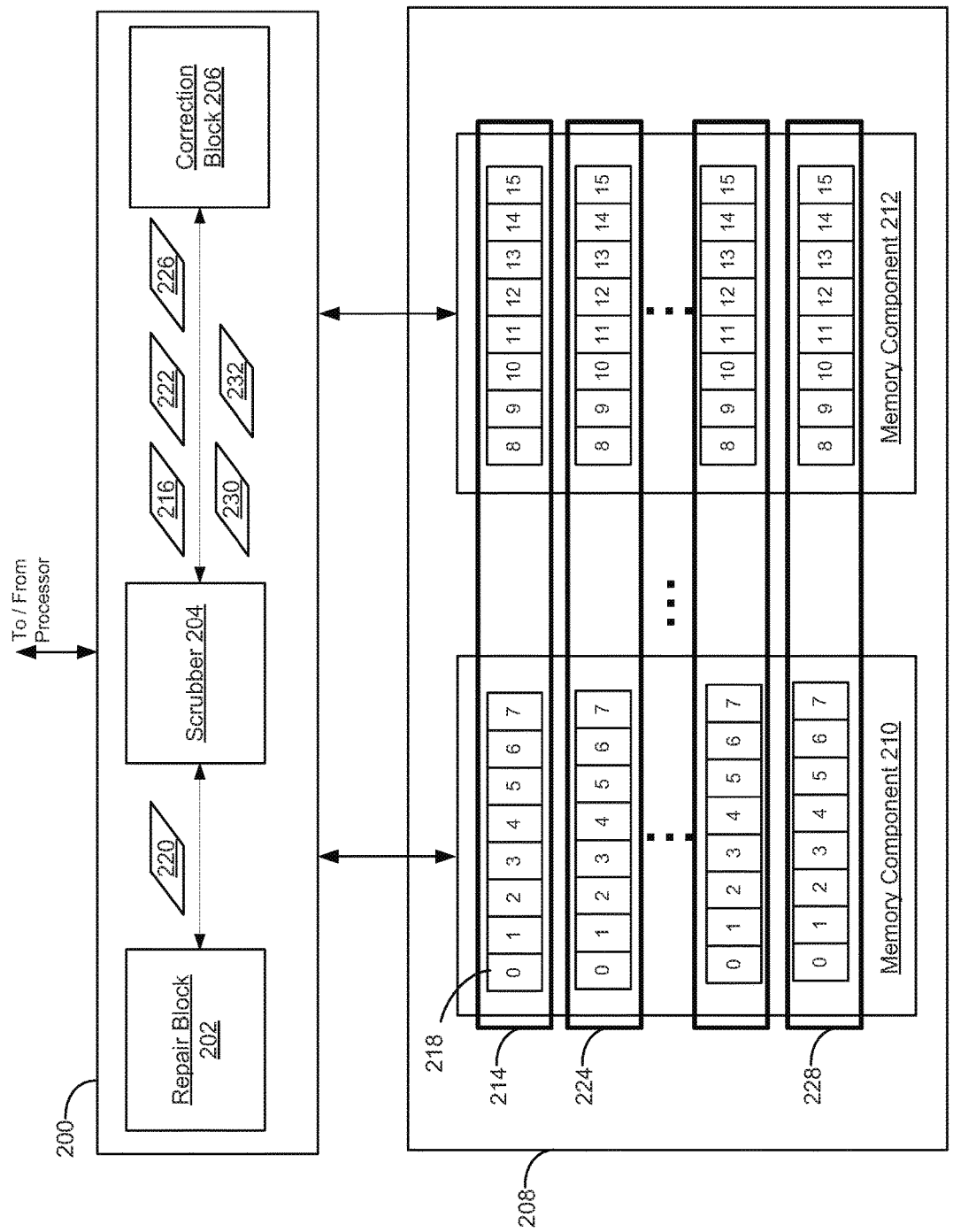
FIG. 2 is a block diagram of a memory controller for correcting an error in stored data and fixing a hardware failure of a data storage device, according to another example.

FIG. 2 is a block diagram of a memory controller 200 for correcting an error in stored data and fixing a hardware failure of a data storage device, according to another example. Memory controller 200 may implement memory controller 100 of FIG. 1. As with memory controller 100, memory controller 200 may be any electronic device suitable to correct an error in stored data and to fix a hardware failure of with a data storage device. Memory controller 200 may include a repair block 202, a scrubber 204, and a correction block 206.

Memory controller 200 may be connected to a data storage device 208. Data storage device 208 may be similar to data storage device 114 of FIG. 1. Data storage device 208 may include a memory component 210 and a memory component 212. Although two memory components are shown in FIG. 2, it should be understood that data storage device 208 may include any number of memory components. In some examples, data storage device 208 may be implemented as a single semiconductor die and each of memory components 210-212 may correspond to a distinct region of the semiconductor die. In some examples, data storage device 208 may be implemented as an integrated circuit and each of memory components 210-212 may correspond to a distinct semiconductor die connected to the integrated circuit. Each of memory components 210-212 may include at least one memory element that stores at least a single bit of data.

During operation, memory controller 200 may manage a flow of data between data storage device 208 and a component of a computing device, such as a processor. For example, memory controller 200 may retrieve data from data storage device 208 and transmit the data to a processor. As another example, memory controller 200 may receive data from the processor and store the data in data storage device 208 for subsequent use.

During operation, memory controller 200 may also perform a memory scrubbing operation on data storage device 208 to correct an error in data stored in data storage device 208 and/or fix a hardware failure of data storage device 208. During a memory scrubbing operation, correction block 206 may inspect data stored in data storage device 208 for error one data block at a time. For example, correction block 206 may inspect a data block 214 in data storage device 208 for error. Correction block 206 may access data block 214 via a read operation and may determine whether there is error in data block 214 via ECC.

Data block 214 may include data stored in memory component 210 and data stored in memory component 212. For example, data block 214 may correspond to 16 bits of data. Data bits 0-7 of data block 214 may be stored in corresponding memory elements of memory component 210 and data bits 8-15 of data block 214 may be stored in corresponding memory elements of memory component 212.

When correction block 206 detects or identifies an error in data block 214, correction block 206 may transmit to scrubber 204 first error information 216 associated with the error. The first error information 216 may include a location of the error and the number of data bits that contain error. In some examples, the location of the error may correspond to a bit number within data block 214 that contains error. For example, first error information 216 may indicate that data bit 1 of data block 214 contains error. As another example, first error information 216 may indicate that data bits 0, 2, and 3 of data block 214 contain error. In some examples, the first error information 216 may include a physical address of a memory element that contains error. For example, first error information 216 may include a physical address of a memory element 218. Memory element 218 may be a memory element of memory component 210 that stores data containing error.

Based on the first error information 216, scrubber 204 may instruct repair block 202 to generate corrected data 220 that is used to correct the error. For example, repair block 202 may generate corrected data 220 using ECC. Repair block 202 may transmit corrected data 220 to scrubber 204. Based on corrected data 220, scrubber 204 may perform a corrective action on data block 214 to correct the error. In some examples, scrubber 204 may perform the corrective action by overwriting the entire data block 214 using corrected data 220. In some examples, scrubber 204 may perform the corrective action by overwriting a data bit in data block 214 that contains the error with corrected data 220.

Subsequent to performing the corrective action, scrubber 204 may determine whether the corrective action is successful. For example, scrubber 204 may instruct correction block 206 to inspect data block 214 again for error. When correction block 206 does not detect any error, correction block 206 may transmit a no error indication 232 to scrubber 204.

No error indication 232 may indicate that no error is found and the error has been corrected. Thus, scrubber 204 may determine that the corrective action is successful and may categorize the error as a soft error. The memory scrubbing operation may be finished with data block 214 and may move on to the next data block.

When correction block 206 detects the same error or another error in data block 214, correction block 206 may transmit to scrubber 204 second error information 222. Second error information 222 may indicate that there is an error in data block 213. In response to receiving second error information 222, scrubber 204 may determine that the corrective action is not successful (i.e., a failed corrective action).

In response to detecting a failed corrective action, scrubber 204 may categorize the error as a hard error. The hard error may indicate a hardware failure of data storage device 208. Scrubber 204 may apply a distinct repair mechanism to fix the hardware failure based on a type of the hardware failure and/or based on a severity of the error in data block 214. Scrubber 204 may determine the severity of the error based on the number of data bits in data block 214 that contain error. Scrubber 204 may compare the severity of the error to a threshold to determine a repair mechanism.

To determine the type of the hardware failure, scrubber 204 may instruct correction block 206 to inspect at least one neighboring data block, such as data block 224, for error. A neighboring data block may be a data block that is within a physical address range of the physical address of data block 214. When correction block 206 detects an error in data block 224, correction block 206 may transmit third error information 226 to scrubber 204. Third error information 226 may include a location of the error in data block 224.

Scrubber 204 may use the error locations in first error information 216 and third error information 226 to determine a first data grouping of the error in data block 214 and a second data grouping of the error in data block 224, respectively. Scrubber 204 may compare the first data grouping to the second data grouping to determine whether there is a common data grouping between the first data grouping and the second data grouping. For example, data bits 0-7 of a data block may belong to data grouping 1 since data bits 0-7 are stored in memory component 210. Data bits 8-15 of the data block may belong to data grouping 2 since data bits 8-15 are stored in memory component 212.

Thus, when the error location in first error information 216 indicates that the error location is within data bits 0-7, scrubber 204 may determine that the first data grouping is data grouping 1. When the error location in first error information 216 indicates that the error location is within data bits 8-15, scrubber 204 may determine that the first data grouping is data grouping 2. When the error location in first error information indicates that the error location is within data bits 0-7 and also within data bits 8-15, scrubber 204 may determine that the first data grouping is data grouping 1 and data grouping 2. Similarly, scrubber 204 may determine the second data grouping using the error location in third error information 226.

When there is no common data grouping between the first data grouping and the second data grouping or when there is no error in data block 224, scrubber 204 may determine that the type of hardware failure is a single data block failure. In some examples, in response to a determination that the type of hardware failure is the single data block failure and/or the severity of the error in data block 214 does not exceed a threshold, scrubber 204 may apply a repair mechanism by re-encoding the data bit in data block 214 that contains error via an encoding mechanism. The encoding mechanism may be different from a previous encoding mechanism used to encode the data bit prior to the memory scrubbing operation. For example, the threshold may be a single data bit containing error. Thus, when there is no common data grouping and/or the severity of the error does not exceed a single data bit, scrubber 204 may re-encode the data bit containing error. As an example, the data bit containing error may be stuck at a value 1 and the correct value may be a value 0, scrubber 204 may re-encode the data bit to the value 0.

In some examples, in response to a determination that the type of hardware failure is the single data block failure and/or the severity of the error in data block 214 does not exceed a threshold, scrubber 204 may not apply any repair mechanism in order to save available system resource. Thus, every time memory controller 200 outputs data block 214 to a component of the computing device, such as a processor, correction block 206 may apply on-the-fly correction to correct the error via ECC.

In some examples, in response to a determination that the type of hardware failure is the single data block failure and/or the severity of the error exceeds the threshold, scrubber 204 may map data block 214 to a spare location in data storage device 208. For example, when there is no common data grouping and/or the severity of the error corresponds to multiple data bits containing error, scrubber 204 may map data in data block 214 to a spare data block 228.

When there is a common data grouping, scrubber 204 may determine that the type of hardware failure is a multiple data block failure, scrubber 204 may identify signature information 230 of a memory component that is associated with the common data grouping. Thus, signature information 230 may be used to identify a memory component where data bits in the common data grouping are stored. Signature information 230 may include a memory die that corresponds to the memory component, a packaging of the memory component, a region within a memory die that corresponds to the memory component, etc. For example, when the common grouping is data grouping 1, signature information 230 may be signature information of memory component 210.

Scrubber 204 may transmit signature information 230 to correction block 206. Correction block 206 may use signature information 230 to determine how to correct the error when performing on-the-fly error correction on data block 214. For example, when determining an error location, correction block 206 may assume that data bits in a particular data grouping contains errors. The particular data grouping may be a data grouping stored in a memory component identified using signature information 230. Thus, correction block 206 may perform additional analysis on the particular data grouping to identify the error location. Correction block 206 may then correct the error. After fixing the hardware failure, the memory scrubbing operation may move onto the next data block.

Figure 3:
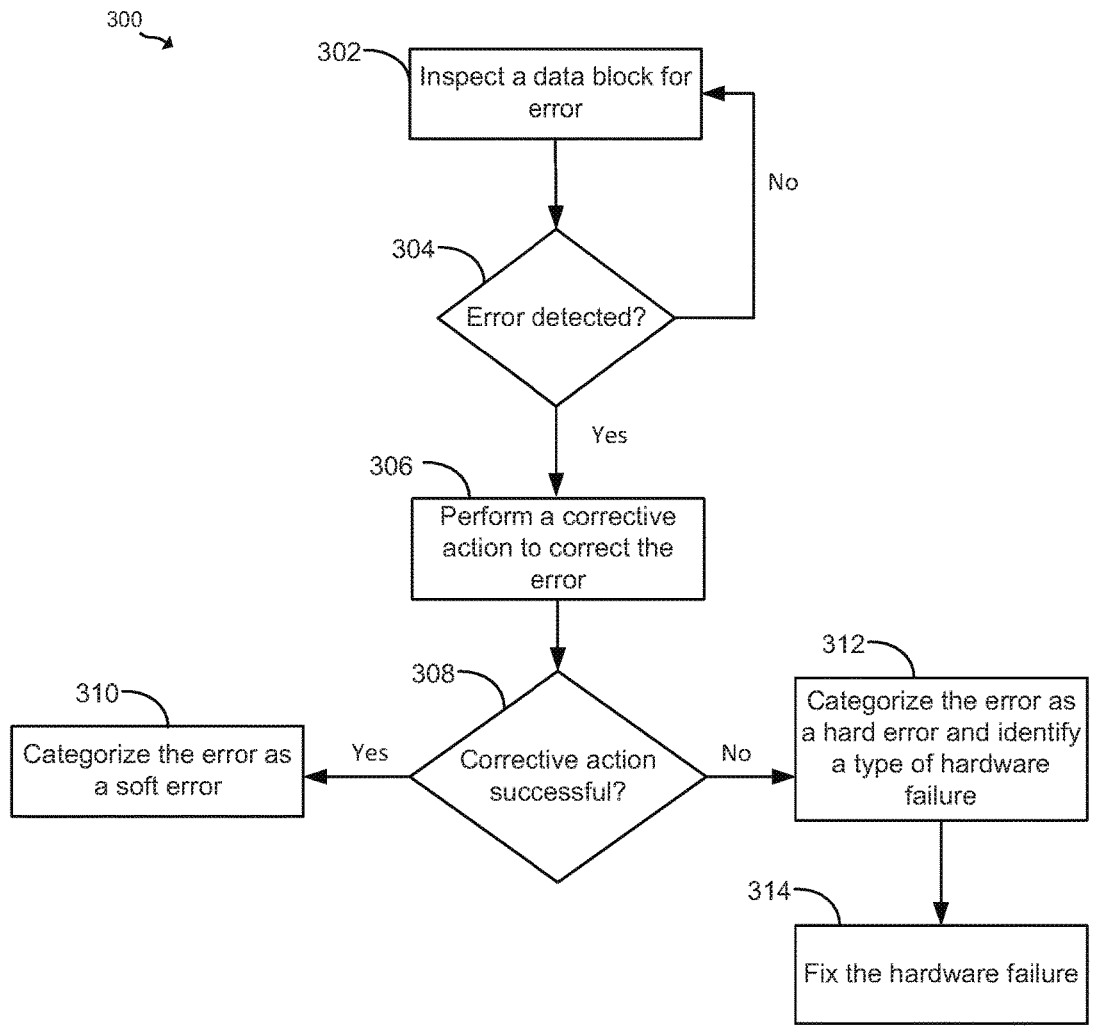
FIG. 3 is a flowchart illustrating a method of correcting an error in stored data and fixing a hardware failure associated with data storage device, according to an example.

FIG. 3 is a flowchart illustrating a method 300 of correcting an error in stored data and fixing a hardware failure associated with data storage device, according to an example. Method 300 may be implemented using memory controller 100 of FIG. 1 and/or memory controller 200 of FIG. 2. Method 300 includes inspecting a data block for error, at 302. For example, referring to FIG. 2, correction block 206 may inspect data block 214 for error. Method 300 also includes determining whether an error is detected, at 304. For example, referring to FIG. 2, when correction block 206 detects or identifies an error in data block 214, correction block 206 may transmit to scrubber 204 first error information 216 associated with the error.

When no error is detected, method 300 may return to block 302 and the next data block may be inspected for error. When an error is detected, method 300 further includes performing a corrective action to correct the error, at 306. For example, referring to FIG. 2, scrubber 204 may perform the corrective action by overwriting the entire data block 214 using corrected data 220.

Method 300 further includes determining whether the corrective action is successful, at 308. For example, referring to FIG. 2, subsequent to perform the corrective action, scrubber 204 may determine whether the corrective action is successful. When the corrective action is successful, method 300 further includes categorizing the error as a soft error, at 310. For example, referring to FIG. 2, in response to a determination that the error location in first error information 216 is not found in second error information 222, scrubber 204 may determine that the corrective action is successful and may categorize the error as a soft error.

When the corrective action is not successful, method 300 further includes categorizing the error as a hard error and identifying a type of hardware failure, at 312. For example, referring to FIG. 2, in response to a determination that the error location in first error information 216 matches the error location in second error information 222, scrubber 204 may determine that the corrective action is not successful (i.e., a failed corrective action). To determine the type of the hardware failure, scrubber 204 may compare a first data grouping of the error in data block 214 to a second data grouping of the error in data block 224.

Method 300 further includes fixing the hardware failure, at 314. For example, referring to FIG. 2, scrubber 204 may apply a distinct repair mechanism to fix the hardware failure based on a type of the hardware failure and based on a severity of the error in data block 214. Block 314 is described in more detail in FIG. 4.

Figure 4:
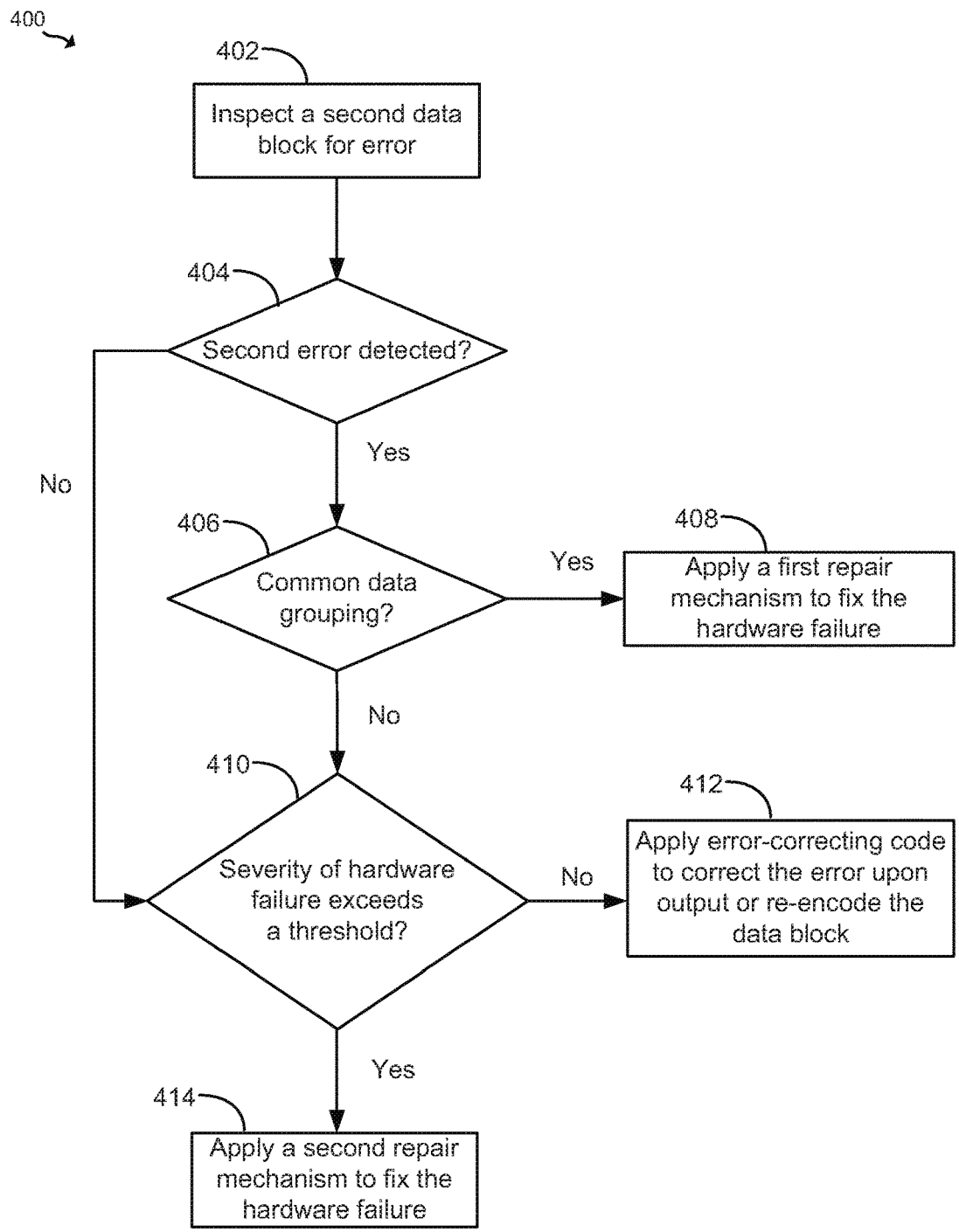
FIG. 4 is a flowchart illustrating a method of fixing a hardware failure of a data storage device, according to an example.

FIG. 4 is a flowchart illustrating a method 400 of fixing a hardware failure of a data storage device, according to an example. Method 400 may implement block 314 of FIG. 3. Method 400 may be implemented memory controller 100 of FIG. 1 and/or memory controller 200 of FIG. 2. Method 400 includes inspecting a second data block for error, at 402. For example, referring to FIG. 2, scrubber 204 may instruct correction block 206 to inspect at least one neighboring data block, such as data block 224, for error.

Method 400 also includes determining whether the second error is detected, at 404. For example, referring to FIG. 2, when correction block 206 detects an error in data block 224, correction block 206 may transmit third error information 226 to scrubber 204. When the second error is detected, method 400 further includes determining whether there is a common data grouping between the error detected in block 304 of FIG. 3 and the second error, at 406. For example, referring to FIG. 2, to determine the type of the hardware failure, scrubber 204 may compare a first data grouping of the error in data block 214 to a second data grouping of the error in data block 224 to determine whether there is a common data grouping between the first data grouping and the second data grouping.

When there is common data grouping, method 400 further includes applying a first repair mechanism to fix the hardware failure, at 408. For example, referring to FIG. 2, when there is a common data grouping, scrubber 204 may determine that the type of hardware failure is a multiple data block failure, scrubber 204 may identify signature information 230 of a memory component that is associated with the common data grouping. Scrubber 204 may transmit signature information 230 to correction block 206. Correction block 206 may use signature information 230 to determine how to correct the error when performing on-the-fly error correction on data block 214.

When there is no common data grouping or when the second error is not detected, method 400 further includes determining whether a severity of the hardware failure exceeds a threshold, at 410. For example, scrubber 204 may compare the severity of the error to a threshold to determine a repair mechanism. When the severity of the hardware failure does not exceed the threshold, method 400 further includes applying error-correcting code to correct the error upon output or re-encode the data block, at 412. For example, referring to FIG. 2, when there is no common data grouping between the first data grouping and the second data grouping or when there is no error in data block 224, scrubber 204 may determine that the type of hardware failure is a single data block failure. In response to a determination that the type of hardware failure is the single data block failure and/or the severity of the error in data block 214 does not exceed a threshold, scrubber 204 may apply a repair mechanism re-encoding the data bit in data block 214 that contains error via an encoding mechanism. In some examples, in response to a determination that the type of hardware failure is the single data block failure and/or the severity of the error does not exceed the threshold, scrubber 204 may not apply any repair mechanism in order to save available system resource. Thus, every time memory controller 200 outputs data block 214 to a component of the computing device, such as a processor, correction block 206 may apply on-the-fly correction to correct the error via ECC.

When the severity of the hardware failure exceeds a threshold, method 400 further includes applying a second repair mechanism to fix the hardware failure, at 414. For example, referring to FIG. 2, in response to a determination that the type of hardware failure is the single data block failure and/or the severity of the error exceeds the threshold, scrubber 204 may map data block 214 to a spare location in data storage device 208.

Figure 5:
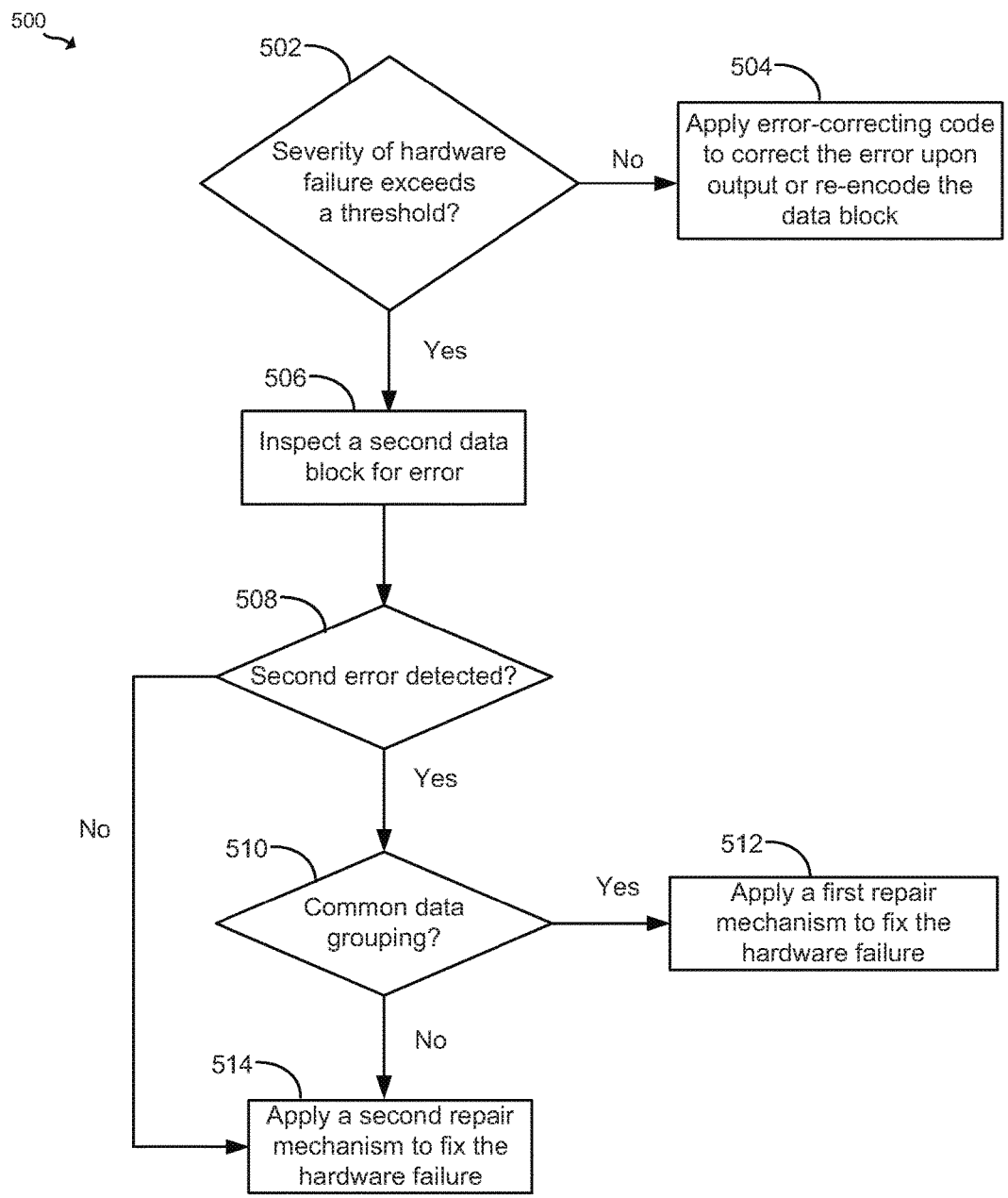
FIG. 5 is a flowchart illustrating a method of fixing a hardware failure of a data storage device, according to another example.

FIG. 5 is a flowchart illustrating a method 500 of fixing a hardware failure of a data storage device, according to another example. Method 500 may implement block 314 of FIG. 3. Method 500 may be implemented memory controller 100 of FIG. 1 and/or memory controller 200 of FIG. 2. Method 500 includes determining whether a severity of the hardware failure exceeds a threshold, at 502. For example, scrubber 204 may compare the severity of the error to a threshold to determine a repair mechanism.

When the severity of the hardware failure does not exceed the threshold, method 500 also includes applying error-correcting code to correct the error upon output or re-encode the data block, at 504. For example, referring to FIG. 2, when the severity of the error in data block 214 does not exceed a threshold, scrubber 204 may apply a repair mechanism by re-encoding the data bit in data block 214 that contains error via an encoding mechanism. In some examples, when the severity of the error in data block 214 does not exceed a threshold, scrubber 204 may not apply any repair mechanism in order to save available system resource. Thus, every time memory controller 200 outputs data block 214 to a component of the computing device, such as a processor, correction block 206 may apply on-the-fly correction to correct the error via ECC.

When the severity of the hardware failure exceeds the threshold, method 500 further includes inspecting a second data block for error, at 506. For example, referring to FIG.

2, scrubber 204 may instruct correction block 206 to inspect at least one neighboring data block, such as data block 224, for error.

Method 500 further includes determining whether the second error is detected, at 508. For example, referring to FIG. 2, when correction block 206 detects an error in data block 224, correction block 206 may transmit third error information 226 to scrubber 204.

When the second error is detected, method 500 further includes determining whether there is a common data grouping between the error detected in block 304 of FIG. 3 and the second error, at 510. For example, referring to FIG. 2, to determine the type of the hardware failure, scrubber 204 may compare a first data grouping of the error in data block 214 to a second data grouping of the error in data block 224 to determine whether there is a common data grouping between the first data grouping and the second data grouping.

When there is common data grouping, method 500 further includes applying a first repair mechanism to fix the hardware failure, at 512. For example, referring to FIG. 2, when there is a common data grouping, scrubber 204 may determine that the type of hardware failure is a multiple data block failure, scrubber 204 may identify signature information 230 of a memory component that is associated with the common data grouping. Scrubber 204 may transmit signature information 230 to correction block 206. Correction block 206 may use signature information 230 to determine how to correct the error when performing on-the-fly error correction on data block 214.

When there is no common data grouping or when the second error is not detected, method 500 further includes applying a second repair mechanism to fix the hardware failure, at 514. For example, referring to FIG. 2, in response to a determination that the type of hardware failure is the single data block failure and/or when the severity of the error exceeds the threshold, scrubber 204 may map data block 214 to a spare location in data storage device 208.

According to the foregoing, examples disclosed herein enable a memory controller to correct an error in data stored in a data storage device and to fix a hardware failure of the data storage device during a memory scrubbing operation. The memory controller may automatically perform a memory scrubbing operation periodically. Thus, the memory controller may perform a memory scrubbing operation without burdening a processor of a computing device. Accordingly, the number of available processor cycles for task execution may be increased.

The use of "comprising", "including" or "having" are synonymous and variations thereof herein are meant to be inclusive or open-ended and do not exclude additional unrecited elements or method steps.

What is claimed is:

1. An apparatus comprising:
   a data storage device; and
   a memory controller coupled to the data storage device, the memory controller to:
      perform, during a memory scrubbing operation, a corrective action to correct an error associated with a data block stored in the data storage device;
      determine, during the memory scrubbing operation, whether the corrective action is successful; and
      in response to a determination that the corrective action is a failed corrective action, fix a hardware failure of the data storage device by performing another action different than the failed corrective action, based on a type of the hardware failure, wherein the type includes a single data block failure and a multiple data block failure.

2. The apparatus of claim 1, wherein the memory controller is to perform the memory scrubbing operation independent of an interrupt.

3. The apparatus of claim 1, wherein when the type is the single data block failure, the memory controller is to re-encode the data block using an encoding mechanism, the encoding mechanism is different from a previous encoding mechanism used to encode the data block prior to the memory scrubbing operation.

4. The apparatus of claim 1, wherein when the type is the single data block failure, the memory controller is to map the data block to a spare location of the data storage device.

5. The apparatus of claim 1, wherein when the type is the multiple data block failure, the memory controller is to identify signature information of a memory component of the data storage device where the hardware failure is identified, wherein the signature information is used to determine how to correct the error.

6. The apparatus of claim 1, wherein the data storage device is implemented using a memristor device.

7. The apparatus of claim 1, wherein the corrective action uses an error-correcting code to correct the error.

8. A method comprising:
   inspecting, via a memory controller, a first data block stored in a data storage device for error during a memory scrubbing operation;
   in response to identifying an error associated with the first data block, performing a corrective action to correct the error via the memory controller;
   determining whether the corrective action is successful during the memory scrubbing operation;
   in response to a determination that the corrective action is a failed corrective action, inspecting a second data block stored in the data storage device to determine a type of a hardware failure of the data storage device; and
   fixing the hardware failure based on the type and based on a severity measure of the hardware failure.

9. The method of claim 8, wherein inspecting the second data block to determine the type of the failure includes:
   in response to identifying a second error associated with the second data block, comparing a first data grouping of the error to a second data grouping of the second error;
   when there is a common data grouping between the first data grouping and the second data grouping, determining the type of the hardware failure as a multiple data block failure; and
   when there is no common data grouping between the first data grouping and the second data grouping, determining the type of the hardware failure as a single data block failure.

10. The method of claim 7, wherein when the severity measure of the hardware failure does not exceed a threshold, applying an error-correcting code to the first data block each time the first data block is outputted via the memory controller.

11. The method of claim 8, wherein when the severity measure of the hardware failure exceeds a threshold and the type is a single data block failure, re-encoding the first data block using an encoding mechanism, the encoding mechanism is different from a previous encoding mechanism used to encode the first data block prior to the memory scrubbing operation.

12. The method of claim 8, wherein when the type is a multiple data block failure, identifying signature information of a memory component of the data storage device where the hardware failure is identified, wherein the signature information is used to determine how to correct the error.

13. A non-transitory computer-readable storage medium comprising instructions when executed cause a memory controller to:
- inspect a first data block stored in a data storage device for error during a memory scrubbing operation;
- in response to identifying a first error associated with the first data block, perform a corrective action to correct the first error;
- in response to determining that the corrective action is a failed corrective action, inspect a second data block stored in the data storage device for error;
- in response to identifying a second error associated with the second data block, compare the second error to the first error to determine a type of a hardware failure of the data storage device, wherein the type includes a single data block failure and a multiple data block failure;
- when the type is the multiple data block failure, apply a first repair mechanism to fix the hardware failure; and
- when the type is the single data block failure, apply a second repair mechanism to fix the hardware failure.

14. The computer-readable storage medium of claim 13, wherein the first repair mechanism corresponds to identifying signature information of a memory component of the data storage device where the hardware failure is identified, and wherein the signature information is used to determine how to correct the first error.

15. The computer-readable storage medium of claim 13, wherein the second repair mechanism corresponds to mapping the first data block to a spare location of the data storage device.

16. The computer-readable storage medium of claim 13, wherein the second repair mechanism corresponds to encoding the first data block using an encoding mechanism, the encoding mechanism is different from a previous encoding mechanism used to encode the first data block prior to the memory scrubbing operation.

* * * * *